Patented Oct. 24, 1950

2,526,962

UNITED STATES PATENT OFFICE 2,526,962

PREVENTION OF DETERIORATION OF HYDROCARBON MATERIALS

Lloyd C. Morris, Bartlesville, Okla., assignor to Phillips Petroleum Company, a corporation of Delaware No Drawing. Application February 4, 1946, Serial No. 645,475

7 Claims. (Cl. 202—57)

This invention relates to the stabilization of hydrocarbon materials against deterioration. In general, such deterioration is manifested by such developments as appearance of odor, formation of peroxides or other oxygen-containing derivatives, depositing of gummy residues, and the like. In a specific embodiment it relates to a method for prevention of the aforesaid types of deterioration in hydrocarbon susceptible to such deterioration and to a specific reagent for use in this method. In a still more specific embodiment it relates to a method for prevention of deterioration during preparation and storage of mixtures of normally liquid, saturated hydrocarbons, comprising a substantial proportion of branched-chain paraffins, which method involves the use of hydrogen sulfide as an inhibiting agent.

In recent years there has been a constantly increasing demand for hydrocarbon solvents, not only for conventional uses such as in dry cleaning, the manufacture of paints, varnishes, waterproofing agents, etc., but also for newly developed products and processes involving specialized requirements not met by ordinary commercially available solvent materials. For example, the production of insect repellents and insecticides has created a need for an organic solvent which is capable of carrying in solution a relatively large concentration of active substance and is at the same time free from color and objectionable odor, non-toxic to man and animals, has a high flash point, and is relatively non-volatile.

It is common knowledge that many organic substances, particularly those containing unsaturated compounds, deteriorate in storage when oxygen is present, with the formation of gummy materials and oxygenated derivatives, and, in some cases, develop objectionable odors. While such deteriorative processes are more common in unsaturated compounds, even some saturated hydrocarbons, and particularly those containing tertiary carbon atoms, exhibit the tendency to develop an unpleasant odor when heated in the presence of air. Often this development of odor is accompanied by the formation of oxygenated compounds such as aldehydes, ketones, carboxylic acids, the unstable substances known as peroxides, and the like.

A common expedient in operations involving hydrocarbon materials of this nature is the employment of oxidation inhibitors such as phenols, substituted phenols and related substances. However, such inhibiting materials are non-volatile and impart an intrinsic odor that is not easily removable from the oils in which they are used. Also such an inhibitor may be an undesired contaminant when the hydrocarbon material is to be used as a solvent, or the like.

I have now found that deterioration in hydrocarbon materials, and particularly in those containing highly branched paraffins, as manifested by development of odor, gummy residues, formation of oxidative substances, and the like, can be eliminated or substantially reduced by the presence of small concentrations of hydrogen sulfide. I have also found that heating and/or distillation of said hydrocarbons can be effected to provide substantially odor-free products when hydrogen sulfide, either added as such or formed in situ, is present in the process.

Obviously, in the practice of my invention, residual hydrogen sulfide and/or sulfur must be removed from the products before their final utilization. This removal may be effected by washing with an aqueous alkaline solution, by distillation, by treatment with sodium polysulfide, or by other suitable means. Furthermore, hydrocarbon stocks treated by the method herein disclosed must be substantially odor free, since the principal object of the invention is to prevent deterioration in fresh stocks.

An object of my invention is to inhibit deterioration of hydrocarbons.

Another object of my invention is to produce an odorless normally liquid hydrocarbon material.

A further object of this invention is to inhibit oxidation, by atmospheric oxygen, of paraffin hydrocarbons.

One object of my invention is to store hydrocarbons without development of odor therein.

One other object of my invention is to distill hydrocarbons, previously exposed to and/or in the presence of oxygen, without development of odor therein.

Still a further object of this invention is to inhibit oxidation of a hydrocarbon having a hydrogen atom attached to a tertiary carbon atom.

Further objects and advantages of my invention will become apparent, to one skilled in the art, from the accompanying disclosure and discussion.

The present invention is particularly applicable to the separation, and/or to the storage, of various useful hydrocarbon fractions. An important example which may be mentioned consists in the production of solvents for dry cleaning, insecticide bases, paint and varnish thinners and the like. A readily available source of fractions boiling in the preferred range for such solvents would appear to lie in the low-odor, substantially water white alkylates produced by interaction of low-boiling isoparaffins with low-boiling olefins, some fractions of which are used in the motor fuel industry. However, the highly branched structure and consequent tendency toward deterioration and odor development during distillation and storage have heretofore been causes for difficulties in the use of this material.

This is believed to be due to the reactivity of so-called tertiary hydrogen atoms present in a large proportion of the isoparaffins, i. e. those hydrogen atoms attached to carbon atoms which are attached to three other carbon atoms.

In the past, low-odor fractions have been produced from these alkylates, and similar hydrocarbons comprising a highly branched molecular structure, by processes involving distillation in an atmosphere of inert gas. Subsequent storage of the fractions so produced was often accomplished in containers in which oxygen was excluded by blanketing with non-oxidizing inert gaseous compounds or by the employment of the aforementioned non-volatile inhibitors.

In one general embodiment the present process comprises supplying hydrogen sulfide to the hydrocarbon during the heating or distilling process, either by direct injection of the gas into the kettle or column, or by obtaining it in situ from an added substance which yields a small continuous supply of hydrogen sulfide at the operating temperature such as, for example, a mercaptan. A resulting hydrocarbon product containing dissolved hydrogen sulfide, or one containing hydrogen sulfide introduced subsequent to distillation, may be stored over long periods without appreciable deterioration. When desired for utilization, highly desirable, substantially odor-free materials are readily obtained by removal of the residual hydrogen sulfide, as by stripping off the hydrogen sulfide in a simple distillation column, or by removing hydrogen sulfide by solvent or chemical action. In general, my invention will be applied to normally liquid hydrocarbons boiling below about 500° F. at atmospheric pressure. Most of the low-odor solvents, to which the invention particularly applies, will have initial boiling points above about 250° F. However, the invention may also be applied with advantage to other hydrocarbons, including those boiling well above 500° F. It is preferred that the hydrocarbon materials be essentially free from hydrocarbons which have such chemical properties that they will react with the hydrogen sulfide under the conditions of its use. Such hydrocarbon materials can contain, or consist essentially of, paraffin, cycloparaffin, and/or aromatic hydrocarbons and should be substantially free from olefins, acetylenes, and the like. The amount of hydrogen sulfide which will give satisfactory results is not great. For example, I have found that if a relatively non-volatile isoparaffinic naphtha having an initial boiling point between 250 and 500° F., and which has previously been exposed to atmospheric oxygen, subsequently is substantially saturated with hydrogen sulfide at atmosphere temperature and pressure and then heated briefly to its boiling point, it will still retain a faint odor of hydrogen sulfide when cooled back to atmospheric temperature (65 to 75° F.) and will be inhibited against odor-development by oxidation. On the other hand, another sample of the same naphtha has been found to develop an offensive odor after similar treatment which differed only in not adding hydrogen sulfide. The minimum amount of hydrogen sulfide which will act as a satisfactory inhibitor for such hydrocarbon materials as discussed herein is about 0.1 per cent of the amount which will effect a saturation of the liquid hydrocarbon material at the conditions of temperature and pressure which would exist in the absence of the addition of hydrogen sulfide. However, in actual practice larger amounts are generally used, up to 50–75% or more of that amount which will effect complete saturation. Thus, during distillation of such a hydrocarbon material hydrogen sulfide is slowly bubbled through the distillation column. In open (non-pressurized) storage sufficient hydrogen sulfide will be present to produce at least a faint odor.

An advantage of the present invention lies in the simplicity of operation as compared with processes employed when heating and distillation are carried out in a normal non-oxiding atmosphere. A further advantage lies in the excellent storage qualities of products prepared by this method, the dissolved hydrogen sulfide providing inhibiting effects against deterioration over long periods of time. A still further advantage lies in the broad field of materials made available for the production of low-odor hydrocarbon materials heretofore employable only at relatively high cost. Other advantages lie in the elimination of non-volatile inhibitors, blanketing gases, etc.

While the particular embodiment described herein has concerned the treatment of mixtures of saturated hydrocarbons comprising a substantial proportion of branched-chain paraffins, its utility as applied to other types of hydro-carbons susceptible to similar deterioration will be apparent, and such application is within the scope of this invention.

*Example*

A fraction of odor-free paraffin hydrocarbons boiling between 365 and 400° F. was obtained by distillation of a heavy alkylate in an atmosphere of inert gas. This heavy alkylate was obtained from a commercial plant in which isobutane was reacted with butenes in the presence of hydrofluoric acid as the alkylation catalyst. Samples of this alkylate fraction were shaken at room temperature with air for 15 minutes, then blown with $H_2S$ or nitrogen, after which they were heated under reflux for varying periods of time. After this heating, and subsequent washing with caustic, the degree of odor development was observed and the samples were tested for the presence of peroxides. The results of these tests, together with a test on a sample which had been subjected to air blowing only, are shown in the following tabulation:

|  | Heating Time, Min. | Heating Temp. | Odor | Peroxide Content, PPM (as $H_2O_2$) |
|---|---|---|---|---|
| Original Alkylate Fraction | None | None | Good | 2 |
| Original Alkylate Fraction | 15 | Boiling Point | Poor | 110 |
| Original Alkylate+$H_2S$ | 15 | do | Good | 3 |
| Original Alkylate+$H_2S$ | 30 | do | do | 3 |
| Original Alkylate+$H_2S$ | 60 | do | do | 3 |
| Original Alkylate+$N_2$ | 15 | do | Very Poor | 137 |

It will be understood that various modifications of my invention can be readily practiced, by one skilled in the art, without departing from the spirit of the disclosure and teachings, or without departing from the scope of the claims.

I claim:

1. An improved process for storing and subsequently making available for use an odorless, paraffinic hydrocarbon liquid, which comprises storing in the presence of added hydrogen sulfide a paraffinic hydrocarbon liquid boiling between 250 and 500° F. and produced by reacting isobutane with butenes under alkylation conditions, said hydrogen sulfide being present in said paraffinic hydrocarbon liquid in an amount equal to at least 0.1 per cent of the amount necessary to saturate said paraffinic hydrocarbon liquid with hydrogen sulfide, and at the end of a storage period removing from said paraffinic liquid said hydrogen sulfide.

2. An improved process for storing and subsequently making available for use an odorless, paraffinic hydrocarbon liquid, which comprises storing in the presence of added hydrogen sulfide a liquid paraffinic alkylate fraction produced by reacting low-boiling isoparaffins with low-boiling olefins under alkylation conditions, and at the end of a storage period removing from said paraffinic liquid said hydrogen sulfide.

3. An improved process for storing and subsequently making available for use an odorless, paraffinic hydrocarbon liquid, which comprises storing in the presence of added hydrogen sulfide a liquid paraffinic alkylate fraction having an initial boiling point above 250° F. and an end point below 500° F. and produced by reacting low-boiling isoparaffins with low-boiling olefins under alkylation conditions, said hydrogen sulfide being present in said alkylate fraction in an amount equal to at least 0.1 per cent of the amount necessary to saturate said alkylate fraction with hydrogen sulfide, and at the end of a storage period removing hydrogen sulfide from said alkylate fraction.

4. An improved method of inhibiting formation of odoriferous compounds in a normally liquid saturated hydrocarbon material during distillation, which comprises distilling in the presence of added hydrogen sulfide a liquid paraffinic alkylate fraction produced by reacting low-boiling isoparaffins with low-boiling olefins under alkylation conditions.

5. An improved method of inhibiting formation of odoriferous compounds in a normally liquid saturated hydrocarbon material during distillation, which comprises distilling in the presence of added hydrogen sulfide an alkylate fraction having an initial boiling point above 250° F. and an end point below 500° F. and produced by reacting low-boiling isoparaffins with low-boiling olefins under alkylation conditions, said hydrogen sulfide being present in an amount equal to at least 0.1 per cent of the amount necessary to saturate said alkylate fraction with hydrogen sulfide.

6. An improved process for storing and subsequently making available for use an odorless, paraffinic hydrocarbon liquid, which comprises storing in the presence of added hydrogen sulfide a liquid paraffinic alkylate fraction having an initial boiling point above 250° F. and an end point below 500° F. and produced by reacting low-boiling isoparaffins with low-boiling olefins under alkylation conditions, said hydrogen sulfide being present in said alkylate fraction in an amount equal to at least 0.1 per cent and no more than 75 per cent of the amount necessary to saturate said alkylate fraction with hydrogen sulfide, and at the end of a storage period removing hydrogen sulfide from said alkylate fraction.

7. An improved method of inhibiting formation of odoriferous compounds in a normally liquid saturated hydrocarbon material during distillation, which comprises distilling in the presence of added hydrogen sulfide an alkylate fraction having an initial boiling point above 250° F. and an end point below 500° F. and produced by reacting low-boiling isoparaffins with low-boiling olefins under alkylation conditions, said hydrogen sulfide being present in an amount equal to at least 0.1 per cent and no more than 75 per cent of the amount necessary to saturate said alkylate fraction with hydrogen sulfide.

LLOYD C. MORRIS.

REFERENCES CITED

The following references are of record in the file of this patent:

UNITED STATES PATENTS

| Number | Name | Date |
| --- | --- | --- |
| 2,131,089 | Beeck et al. | Sept. 27, 1938 |
| 2,184,235 | Groll et al. | Dec. 19, 1939 |
| 2,269,028 | Liedholm et al. | Jan. 6, 1942 |
| 2,282,451 | Brooks | May 12, 1942 |
| 2,305,538 | Liedholm et al. | Dec. 15, 1942 |
| 2,315,107 | Chickinoff et al. | Mar. 30, 1943 |
| 2,407,861 | Wolk | Sept. 17, 1946 |